United States Patent [19]
Marsh

[11] 3,826,306
[45] July 30, 1974

[54] APPARATUS HAVING ONE OR MORE ROTATABLY DRIVEN COMPONENTS

[75] Inventor: Charles Richard Marsh, Romiley, near Stockport, England

[73] Assignee: Auto-Masters Limited, Hyde, Cheshire, England

[22] Filed: Feb. 23, 1973

[21] Appl. No.: 335,281

[30] Foreign Application Priority Data
Feb. 23, 1972  Great Britain ............... 8267/72

[52] U.S. Cl. .................... 165/47, 165/80, 74/230.6
[51] Int. Cl. ............................................ F24h 3/00
[58] Field of Search ................ 165/47, 80; 74/230.6

[56] References Cited
UNITED STATES PATENTS
2,850,852  9/1958  Hofberger ..................... 74/230.6
3,229,424  1/1966  Fairchok ........................ 74/230.6

*Primary Examiner*—Charles Sukalo
*Attorney, Agent, or Firm*—Sughrue, Rothwell, Mion, Zinn & Macpeak

[57] ABSTRACT

To prevent heat degradation of a rubber driving belt passing around a pulley keyed to a shaft of a heated roller, cooling air is blown onto a side of the pulley from a ring of jets extending around the shaft, and the pulley is formed with passages extending in rings around the shaft to permit the air to pass through the pulley.

17 Claims, 10 Drawing Figures

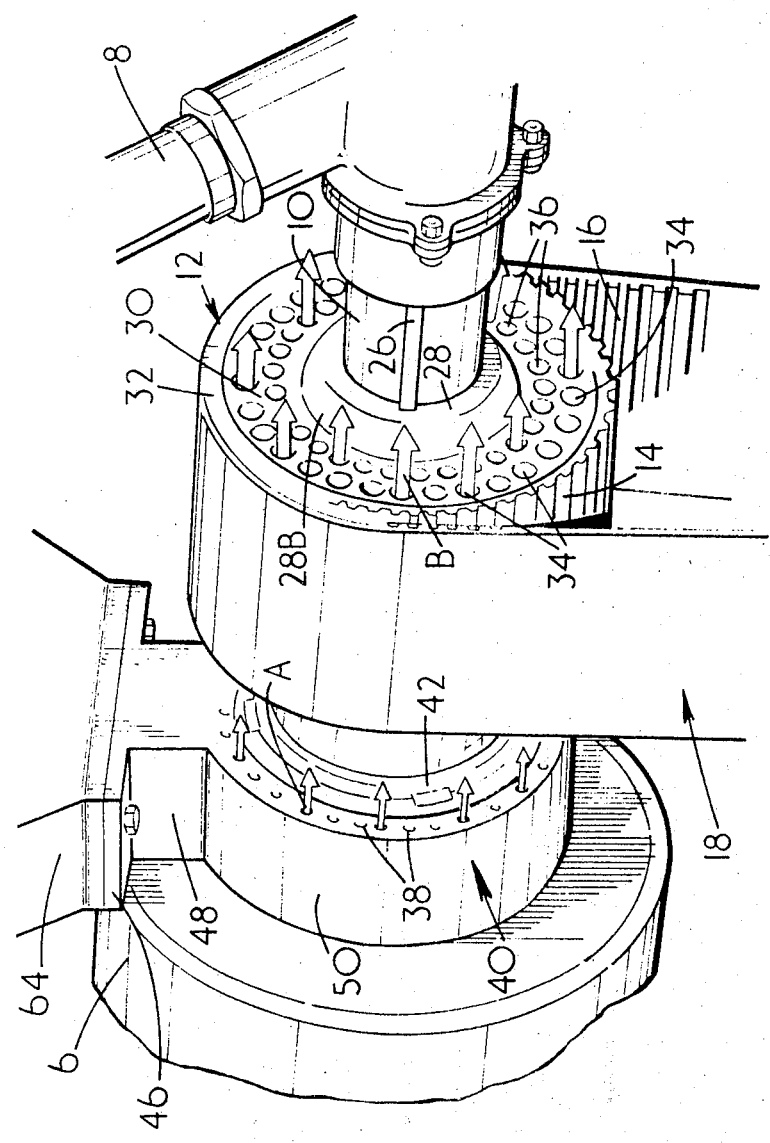

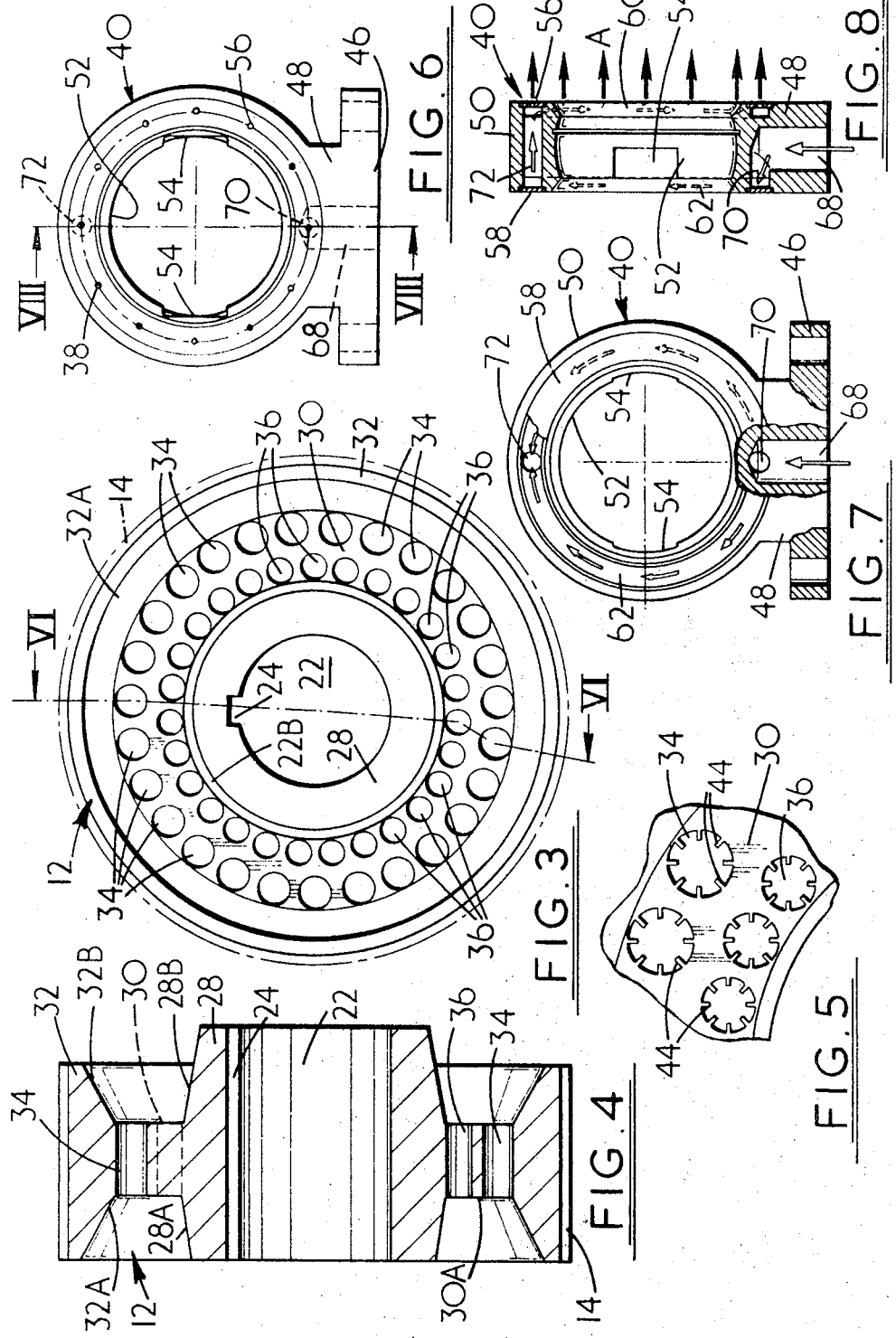

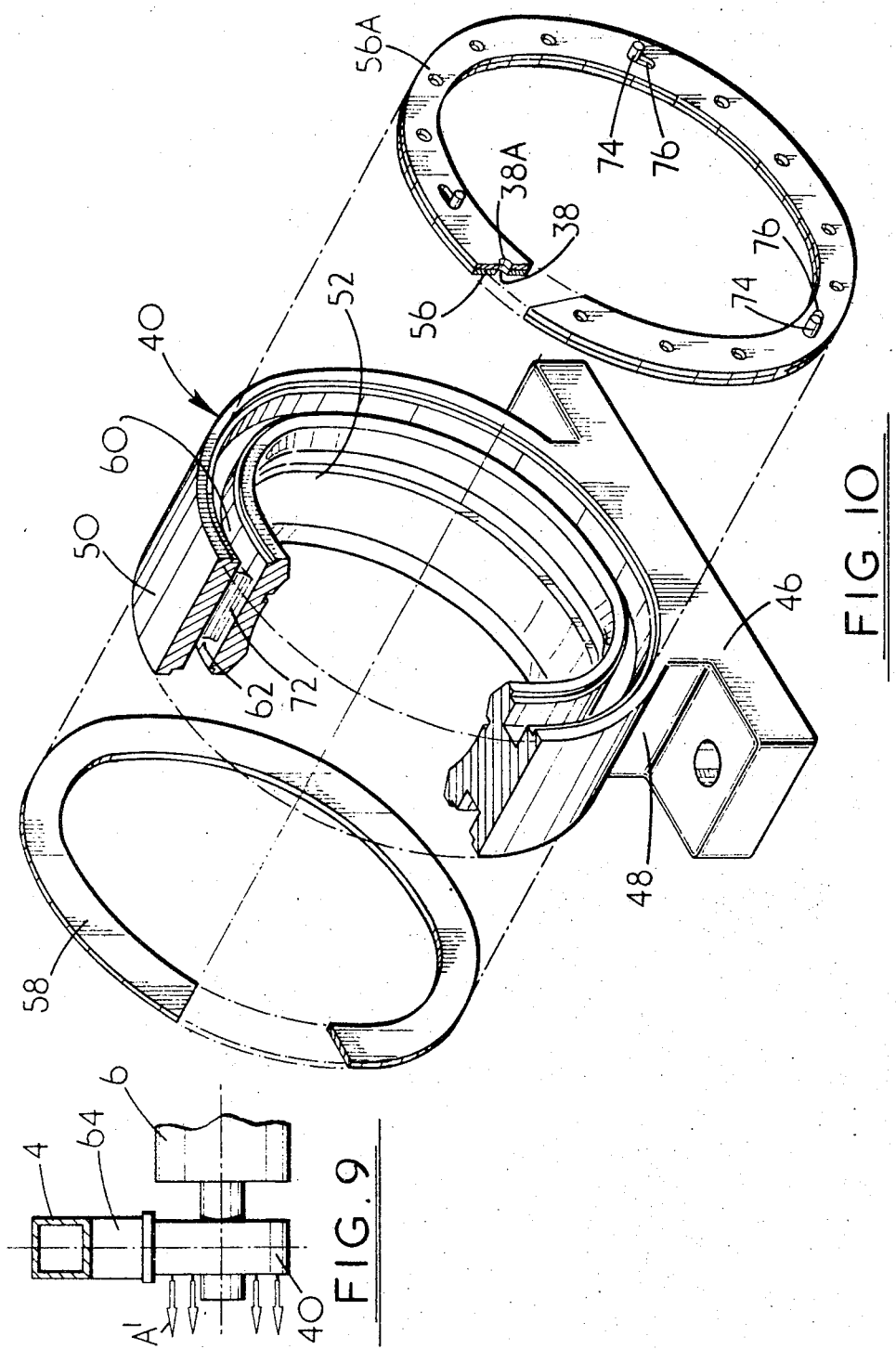

APPARATUS HAVING ONE OR MORE ROTATABLY DRIVEN COMPONENTS

This invention relates to improvements in apparatus having one or more rotatably driven components.

Hitherto in apparatus having at least one rotatably driven component which becomes hot or is heated to a relatively high temperature during use, difficulties were experienced using a rubber belt and pulley driving system, since a pulley on a shaft carrying the component also becomes heated by conduction from the shaft, and the temperature of the hot pulley degrades the belt. In practice this has meant the use of metal chain drives or gearing, and the advantages of belt drives, and particularly rubber timing belt drives, have had to be foregone.

An object of the invention is to overcome the above difficulties.

According to the invention an apparatus having at least one rotatably driven component, comprises a rotatable component on which is mounted a pulley for rotating said component, said pulley being arranged for rotation by a driving belt, jet means for continuously directing at least one stream of fluid onto said pulley to cool same, and said pulley having passage means to permit passage of said fluid therethrough.

The invention will now be further described with reference to the accompanying drawings. In the drawing:

FIG. 2 is a perspective view on an enlarged scale of a pulley and jet means on the apparatus of FIG. 1;

FIG. 3 is a front elevation on an enlarged scale of the pulley in FIG. 2;

FIG. 4 is a section on line VI — VI in FIG. 3;

FIG. 5 is a front elevation of a fragment of a modification of the pulley in FIG. 3;

FIG. 6 is a front elevation on a smaller scale of the combined jet means and bearing housing in FIG. 2;

FIG. 7 is a rear elevation, partially fragmented, of the jet means and bearing housing in FIG. 6;

FIG. 8 is a section on line viii — viii in FIG. 7;

FIG. 9 is a diagrammatic side view on a smaller scale of a simillar means and bearing housing, to that in FIG. 6 supporting a bearing in which is journalled an opposite end of the shaft of the heated roller in FIG. 2, and, FIG. 10 is an enlarged exploded perspective view of alternative jet means and bearing housing.

Figure 1:
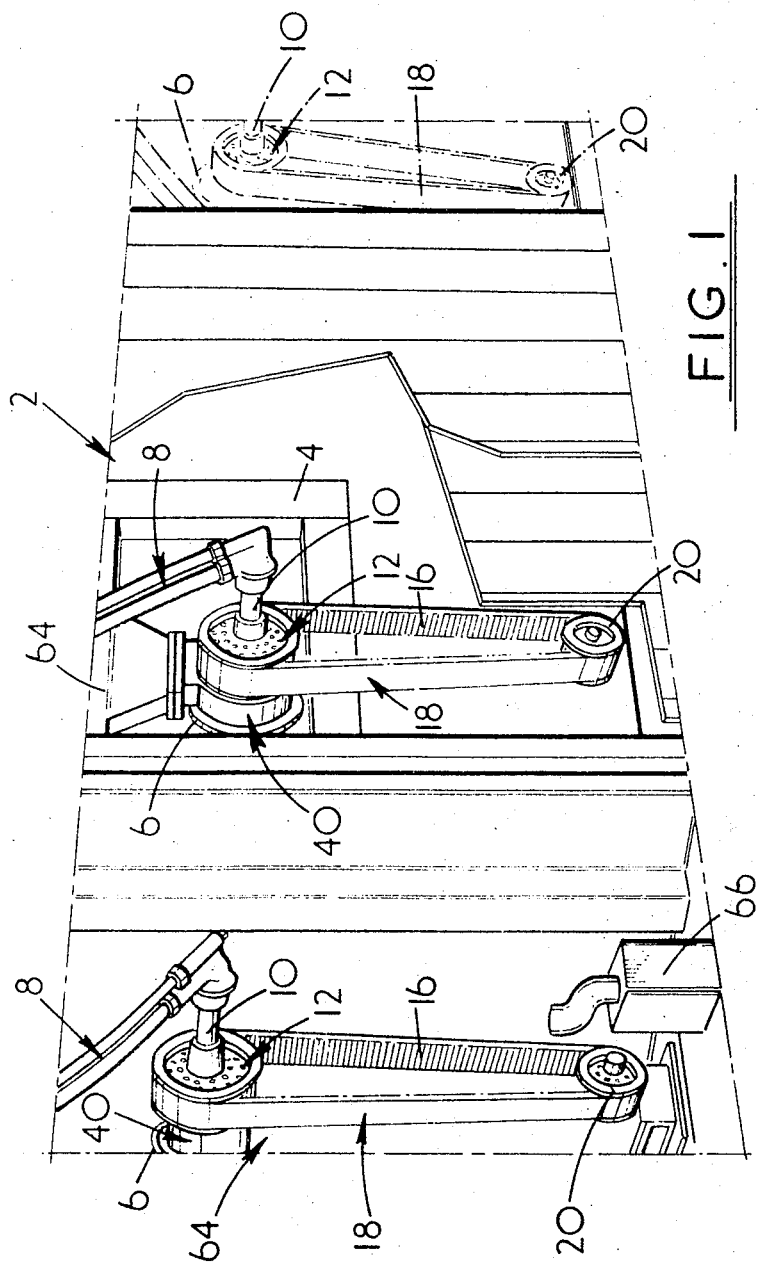
FIG. 1 is fragmentary faragmentary perspective view of part of an apparatus formed according to the invention with heated driven rollers for handling web material.

Referring to the drawings, apparatus 2 in FIG. 1 is a machine with tubular interconnected frame members 4 mounting by means to be subsequently described rotatably driven heated rollers 6 for conveying and treating flexible webs of material. Each roller is of any suitable construction known per se for continuous heating by hot liquid supplied to the interior thereof from a suitable source known per se by piping 8 and through a respective roller shaft 10.

Each shaft 10 has keyed thereto a metal pulley 12 with teeth or splines 14 (FIG. 2) on its outer periphery meshing with teeth 16 on a timing belt 18 of rubber or synthetic rubber driven by another pulley 20, rotated by a suitable source of rotary power (not shown).

Referring to FIGS. 2 to 4, the pulley has a central bore 22 to receive the shaft 10 and has a keyway 24 for engagement by a shaft key 26. The bore 22 is formed in a hub 28 from which radiates a web 30 of reduced thickness to a peripheral rim 32 formed with the teeth 14. A plurality of through passages 34 and 36 are formed in the web 30 in two rings, substantially concentric with the bore 22 the axis of which is substantially parallel to the axes of the passages. Passages 34 are of larger diameter and staggered relative to the passages 36 forming the inner ring. Side face 28A and 32A of the hub and rim respectively, slope convergently towards the web 30, whilst on the opposite side of the web, corresponding side faces 28B and 32B also slope convergently towards the web.

The pulley 12 is mounted so that side 30A of the web faces jets 38 in a housing 40 (to be described in more detail below) mounting a bearing 42 for the shaft 10.

These jets are disposed in a ring substantially concentric with the shaft 10 and direct a fluid, for example air, issuing continuously therefrom in the direction of arrows A (FIG. 2) towards the pulley. Sides 28A and 32A channel the air towards the web 30 through which it passes through the passages 34 and 36 in the direction of arrows B (FIG. 2) to cool the web 30. To improve the cooling effect the passages may be formed with internal fins 44 (FIG. 5). Because of this cooling, the chance of the rim 32 reaching a sufficiently high temperature to degrade the belt 18 is eliminated or at least considerably reduced. This beneficial result is also aided by the fact that the staggering of the passages 34, 36 compels heat travelling through the web 30 from the shaft 10, to follow a tortuous path.

The housing 40 in FIGS. 6 to 8 has a mounting flange 46 and neck 48 on which is mounted a cylinder 50 with a central bore 52 recessed at 54 to facilitate diammetrically assembling of the bearing 42 (FIG. 2) in the housing. Opposite end faces of the cylinder 50 each have an annular recess covered by an annular plate 56 provided with the ring of jet apertures 38 and a blank annular plate 58 respectively, to form annular chambers 60 and 62 in the housing. The flange 46 is secured to a duct 64 communicating with the frame members 4 supplied with air under pressure from a blower shown diagrammatically at 66.

Air from duct 64 passes into the housing 40 via bores 68 and 70 into chamber 62 where it diverts into two counterflowing streams which meet and pass together through a bore 72 diametrically opposite to bore 70. On emerging from bore 72 the air enters chamber 60 and diverts again into two counterflowing streams. From this chamber the air emerges through the jet apertures 38 in the direction of arrows A (FIGS. 2 and 8) and then through the pulley 10.

The air circulating in the housing 40 also has the effect of cooling the bearing 42.

As shown in FIG. 9, the other end apertures the roller shaft, remote from can pulley 12, can be journalled in a bearing in a housing 40 supplied with pressure air via the frame member 4 and ducting 64. The air leaves the housing, in the direction of arrows A', after circulating therethrough to cool the bearing.

If desired, the total area of the jet aperatures 38 in a housing 40 ca be less than the cross-sectional area of the air supply passage-way to the housing to increase the air velocity through the jet apertures therein.

The air pressure from the blower may be about 1 pound per square inch above atmospheric pressure. This has been found to give adequate cooling of the pulley, and because the pressure is relatively low, sealing of the air supply system does not have to be absolutely total.

In the modification in FIG. 10, a further annular plate 56A with a ring of apertures 38A, of the same size as apertures 38, is mounted in front of plate 56 by means of clamping screws 74 engaging plate 56 and passing through arcuate slots 76 in plate 56A. The position of plate 56A can be rotatably adjusted relatively to plate 56 to bring the apertures 38A into full coincidence with apertures 38 or for the plate 56A to fully or partially block the apertures 38 so that size of each jet defined by the two respective apertures 38 and 38A can be varied as desired.

If desired the timing belt 18 can be replaced by one or more V-belts, and the pulley 10 formed with one or more peripheral V-grooves, or any other shape of belt can be used with pulleys of appropriately shaped peripheries. Also the belts can be of leather or any other suitable material.

Although air has been given as a specific example of the cooling liquid, any suitable fluid can be used.

The pulley 12 can be formed with any number of rings of passages from one ring upwards.

Sides 32A and 28A, and likewise sides 32B and 28B need not be convergent but can be substantially parallel. Also the pulley 12 can be mounted so that the side opposite to 30A faces the jet apertures.

If desired, the roller can be continously heated by steam or any other means, for example, electrical means.

What is claimed is:

1. An apparatus having at least one rotatably driven component comprising a rotatable component on which is mounted a pulley for rotating said component, said pulley being arranged for rotation by a driving belt, jet means for continously directing at least one stream of fluid onto said pulley to cool same, and said pulley having passage means to permit passage of said fluid therethrough.

2. An apparatus as claimed in claim 1 in which the passage means comprise a plurality of passages disposed in at least one ring about a driving shaft, on which the pulley and roller are mounted.

3. An apparatus as claimed in claim 1 in which the passage means comprise a plurality of passages disposed in at least two substantially concentric rings about a driving shaft on which the pulley and roller are mounted, and the passages in an outer ring are in staggered disposition relatively to the passages in an inner ring.

4. An apparatus as claimed claim 1, in which the pulley has a central hub, a peripheral rim and a web interconnecting the hub and rim, and the passage means being formed in the web.

5. An apparatus as claimed in claim 4, in which the web is of reduced thickness relative to the hub and rim, and sides of the hub and rim adjacent to a side of the web converge towards each other in a direction towards the side of the web.

6. An apparatus as claimed in claim 2 in which the jet means comprises a plurality of apertures disposed in a ring about the shaft.

7. An apparatus as claimed in claim 6, in which the ring of apertures is formed in a side of a housing mounting a bearing for the shaft.

8. An apparatus as claimed in claim 7, in which the housing comprises first and second axially spaced annular chambers extending around the bearing, the housing being formed with first bore means for admitting the fluid into the first chamber, the housing being formed with second bore means interconnecting the two chambers and disposed substantially diammetrically opposite to the first bore means, and a side of the second member is formed with the ring of apertures therein.

9. An apparatus as claimed in claim 8, in which shaft means on a side of the driven component remote from the pulley is mounted in a second bearing in a second housing comprising third and fourth axially spaced annular chambers extending around the second bearing, the second housing being formed with third bore means for admitting cooling fluid into the third chamber, the second housing being formed with fourth bore means interconnecting the third and fourth chambers and disposed substantially diammetrically opposite to the third bore means, and a side of the fourth chamber is formed with a ring of fluid outlet apertures therein extending around the axis of said shaft means.

10. An apparatus as claimed in claim 1, in which the fluid is air.

11. An apparatus as claimed in claim 8, in which the fluid is air conveyed to the first bore means via tubular members of a frame of the apparatus connected to air supply means.

12. An apparatus as claimed in claim 9, in which the fluid is air conveyed to the third bore means via tubular members of a frame of the apparatus connected to air supply means.

13. An apparatus as claimed in claim 1, in which fluid outlets from the jet means are of adjustably variable size.

14. An apparatus as claimed in claim 1, in which the passage means are formed with fins.

15. An apparatus as claimed in claim 1, in which the belt is a timing belt.

16. An apparatus as claimed in claim 1, in which the rotatably driven component is a heated roller.

17. Apparatus comprising:
  1. a component adapted to be
    a. continuously heated during use of said apparatus and
    b. rotated about an axis;
  2. a pulley mounted on said component and adapted to be rotated about said axis by a driving belt, said pulley having passage means therein at least generally parallel to said axis; and
  3. jet means located adjacent to said pulley and adapted to direct a stream of fluid onto said pulley and into said pssage means therein independently of the rotation of said pulley, thereby preventing heat from said component from degrading a belt driving said pulley even when said pulley is not being rotated.

* * * * *